United States Patent
Rupp

(12) 
(10) Patent No.: US 10,794,624 B2
(45) Date of Patent: Oct. 6, 2020

(54) PORTABLE FROZEN CONFECTION MACHINE

(71) Applicant: Snowie LLC, Salt Lake City, UT (US)

(72) Inventor: Carl A. Rupp, Salt Lake City, UT (US)

(73) Assignee: Snowie LLC, Sat Lake City, UT (US)

( * ) Notice: Subject to any disclaimer, the term of this patent is extended or adjusted under 35 U.S.C. 154(b) by 1072 days.

(21) Appl. No.: 14/520,254

(22) Filed: Oct. 21, 2014

(65) Prior Publication Data
US 2015/0136887 A1    May 21, 2015

Related U.S. Application Data

(60) Provisional application No. 61/893,658, filed on Oct. 21, 2013, provisional application No. 62/006,741, filed on Jun. 2, 2014.

(51) Int. Cl.
| | |
|---|---|
| *F25C 5/02* | (2006.01) |
| *F25C 5/12* | (2006.01) |
| *A23G 9/04* | (2006.01) |
| *A23G 9/28* | (2006.01) |
| *B02C 18/22* | (2006.01) |
| *A47J 43/046* | (2006.01) |

(52) U.S. Cl.
CPC ............ *F25C 5/12* (2013.01); *A23G 9/045* (2013.01); *A23G 9/28* (2013.01); *B02C 18/2216* (2013.01); *B02C 18/2291* (2013.01); *F25C 5/02* (2013.01); *A47J 43/046* (2013.01)

(58) Field of Classification Search
CPC ...... A23G 9/28; A23G 9/045; B02C 18/2216; B02C 18/2291; F25C 5/02; F25C 5/12; A47J 43/046

USPC ........ 241/191, 101.2, DIG. 17; 62/342, 345, 62/346, 354
See application file for complete search history.

(56) References Cited

U.S. PATENT DOCUMENTS

| | | | | |
|---|---|---|---|---|
| 2,081,001 | A | * | 5/1937 | Coscia ............... F25C 5/12 241/92 |
| 2,618,282 | A | * | 11/1952 | Stanitz ............ A47L 15/4259 134/188 |
| 2,626,133 | A | * | 1/1953 | Reed ................ A23G 9/045 366/206 |
| 2,758,623 | A | * | 8/1956 | Malz ................ A47J 43/046 215/382 |
| 2,905,397 | A | * | 9/1959 | De Angelis ........ F25C 5/046 241/188.1 |
| 3,313,332 | A | * | 4/1967 | Otto ................ A47J 43/046 241/101.8 |

(Continued)

FOREIGN PATENT DOCUMENTS

| | | |
|---|---|---|
| CN | 103096769 A | 5/2013 |
| CN | 203122131 U | 8/2013 |

(Continued)

*Primary Examiner* — Shelley M Self
*Assistant Examiner* — Smith Oberto Bapthelus
(74) *Attorney, Agent, or Firm* — Terrence J. Edwards; TechLaw Ventures, PLLC

(57) ABSTRACT

The disclosure extends to apparatuses, methods, and systems, for producing frozen confections and conditioning ice for use in frozen confections. The disclosure further extends to apparatuses, methods, and systems for providing a frozen confection machine that is portable and sized for easy storage as well as a portable frozen convection experience.

23 Claims, 6 Drawing Sheets

(56) References Cited

U.S. PATENT DOCUMENTS

| | | | | |
|---|---|---|---|---|
| 3,461,934 A | * | 8/1969 | Waters | A47J 43/046 241/82.1 |
| 3,552,663 A | * | 1/1971 | Royals | A23G 9/045 241/278.1 |
| 3,791,159 A | * | 2/1974 | Devlin | A23G 9/045 426/524 |
| 4,113,190 A | * | 9/1978 | Fudman | B02C 18/12 241/92 |
| 4,238,079 A | * | 12/1980 | Otto | A47J 43/046 241/248 |
| 4,286,811 A | * | 9/1981 | Schantz | D06F 37/42 292/201 |
| 4,655,403 A | | 4/1987 | Sciortino | |
| 4,681,030 A | * | 7/1987 | Herbert | A23G 9/045 366/144 |
| 4,718,610 A | * | 1/1988 | Gallaher | A23G 9/045 241/101.2 |
| 4,733,827 A | * | 3/1988 | Williams | A47J 43/07 206/373 |
| 4,786,002 A | * | 11/1988 | Mitsubayashi | A23G 9/045 241/101.8 |
| 4,884,755 A | * | 12/1989 | Hedrington | A47J 43/255 241/37.5 |
| 4,906,486 A | * | 3/1990 | Young | A23G 9/045 241/169.1 |
| 4,910,973 A | * | 3/1990 | Osrow | A23G 9/14 366/149 |
| 4,962,895 A | * | 10/1990 | Gallaher | F25C 5/12 241/101.2 |
| 5,050,809 A | * | 9/1991 | Rupp | F25C 5/12 222/129.1 |
| 5,242,125 A | | 9/1993 | Rupp | |
| 5,323,691 A | * | 6/1994 | Reese | A23G 9/045 99/275 |
| 5,447,371 A | * | 9/1995 | Agapiou | A23G 9/045 366/149 |
| 5,546,773 A | * | 8/1996 | Lee | D06F 39/14 160/188 |
| 5,619,901 A | * | 4/1997 | Reese | A23G 9/045 222/132 |
| 6,083,246 A | * | 7/2000 | Stendahl | A61N 1/3925 607/5 |
| 6,194,013 B1 | * | 2/2001 | Kolar | A23G 9/045 222/77 |
| 6,216,968 B1 | * | 4/2001 | Karkos, Jr. | A23G 9/045 241/101.2 |
| 6,336,603 B1 | * | 1/2002 | Karkos, Jr. | A23G 9/045 241/101.2 |
| 6,553,779 B1 | * | 4/2003 | Boyer | A23G 9/045 222/146.6 |
| 6,793,167 B2 | * | 9/2004 | Karkos, Jr. | A23G 9/045 241/101.2 |
| 6,908,053 B2 | * | 6/2005 | Rupp | A23G 9/045 241/86.1 |
| 6,959,562 B2 | * | 11/2005 | Navedo | A23G 9/045 366/251 |
| 7,100,392 B2 | * | 9/2006 | Cortese | A23G 9/045 366/144 |
| 7,520,456 B2 | * | 4/2009 | Swegle | A23G 9/045 241/100 |
| 7,587,972 B2 | * | 9/2009 | Katz | A23G 9/045 99/275 |
| 8,939,389 B2 | * | 1/2015 | Rupp | F25C 5/12 241/36 |
| 2002/0079393 A1 | * | 6/2002 | Karkos, Jr. | A23G 9/045 241/92 |
| 2005/0126201 A1 | * | 6/2005 | Navedo | A23G 9/045 62/344 |
| 2005/0257578 A1 | * | 11/2005 | Gnadinger | D06F 37/42 68/12.26 |
| 2005/0258196 A1 | * | 11/2005 | Romanyszyn | A23G 9/045 222/410 |
| 2006/0086255 A1 | * | 4/2006 | Liu | A23G 9/045 99/275 |
| 2006/0117785 A1 | * | 6/2006 | Presswood, Jr. | A23G 9/045 62/340 |
| 2006/0186238 A1 | * | 8/2006 | Swegle | A23G 9/045 241/277 |
| 2007/0235490 A1 | | 10/2007 | Katz et al. | |
| 2008/0184714 A1 | * | 8/2008 | Sveinsson | C09K 5/066 62/68 |
| 2011/0101039 A1 | * | 5/2011 | Cocchi | A23G 9/28 222/517 |
| 2011/0198427 A1 | * | 8/2011 | Seol | A47J 43/046 241/291 |
| 2012/0048977 A1 | * | 3/2012 | Machovina | A47J 43/046 241/277 |
| 2013/0126650 A1 | | 5/2013 | Hotaling et al. | |
| 2013/0134248 A1 | * | 5/2013 | Gushwa | A47J 43/0716 241/101.2 |
| 2013/0233142 A1 | | 9/2013 | Rupp | |
| 2013/0256437 A1 | * | 10/2013 | Lin | A47J 43/046 241/97 |
| 2014/0158710 A1 | * | 6/2014 | Lunn | B67D 3/0012 222/63 |
| 2015/0136887 A1 | * | 5/2015 | Rupp | A23G 9/045 241/191 |
| 2015/0342218 A1 | * | 12/2015 | Rupp | A23G 9/045 241/191 |
| 2017/0112164 A1 | * | 4/2017 | Rupp | A23G 9/28 |
| 2017/0135373 A1 | * | 5/2017 | Rupp | A23G 9/28 |
| 2017/0135374 A1 | * | 5/2017 | Rupp | A23G 9/28 |

FOREIGN PATENT DOCUMENTS

| | | | |
|---|---|---|---|
| JP | SHO 48-7651 | | 2/1973 |
| JP | SHO 60-196575 | | 10/1985 |
| JP | 2007155272 | * | 6/2007 |
| JP | 2013-537808 | | 10/2013 |
| WO | 2012030480 A2 | | 3/2012 |

* cited by examiner

PORTABLE FROZEN CONFECTION MACHINE

CROSS-REFERENCE TO RELATED APPLICATIONS

This application claims the benefit of U.S. Provisional Application No. 61/893,658, filed Oct. 21, 2013, entitled "Portable Frozen Confection Machine," and claims the benefit of U.S. Provisional Application No. 62/006,741, filed Jun. 2, 2014, entitled "Portable Frozen Confection Machine" which are hereby incorporated by reference herein in their entirety, including but not limited to those portions that specifically appear hereinafter, the incorporation by reference being made with the following exception: In the event that any portion of the above-referenced applications is inconsistent with this application, this application supercedes said portion of said above-referenced applications.

STATEMENT REGARDING FEDERALLY SPONSORED RESEARCH AND DEVELOPMENT

Not Applicable.

BACKGROUND

Frozen confections have become increasingly popular and desired in more and more settings. Machines for conditioning the ice used in frozen confections are typically large and of commercial grade in order to accommodate the commercial settings in which they are used. However, often frozen confections are desired in a commercial or home environment or small party setting where portability and storage are needed. What is needed is a frozen confection machine that is portable and sized for easy storage.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
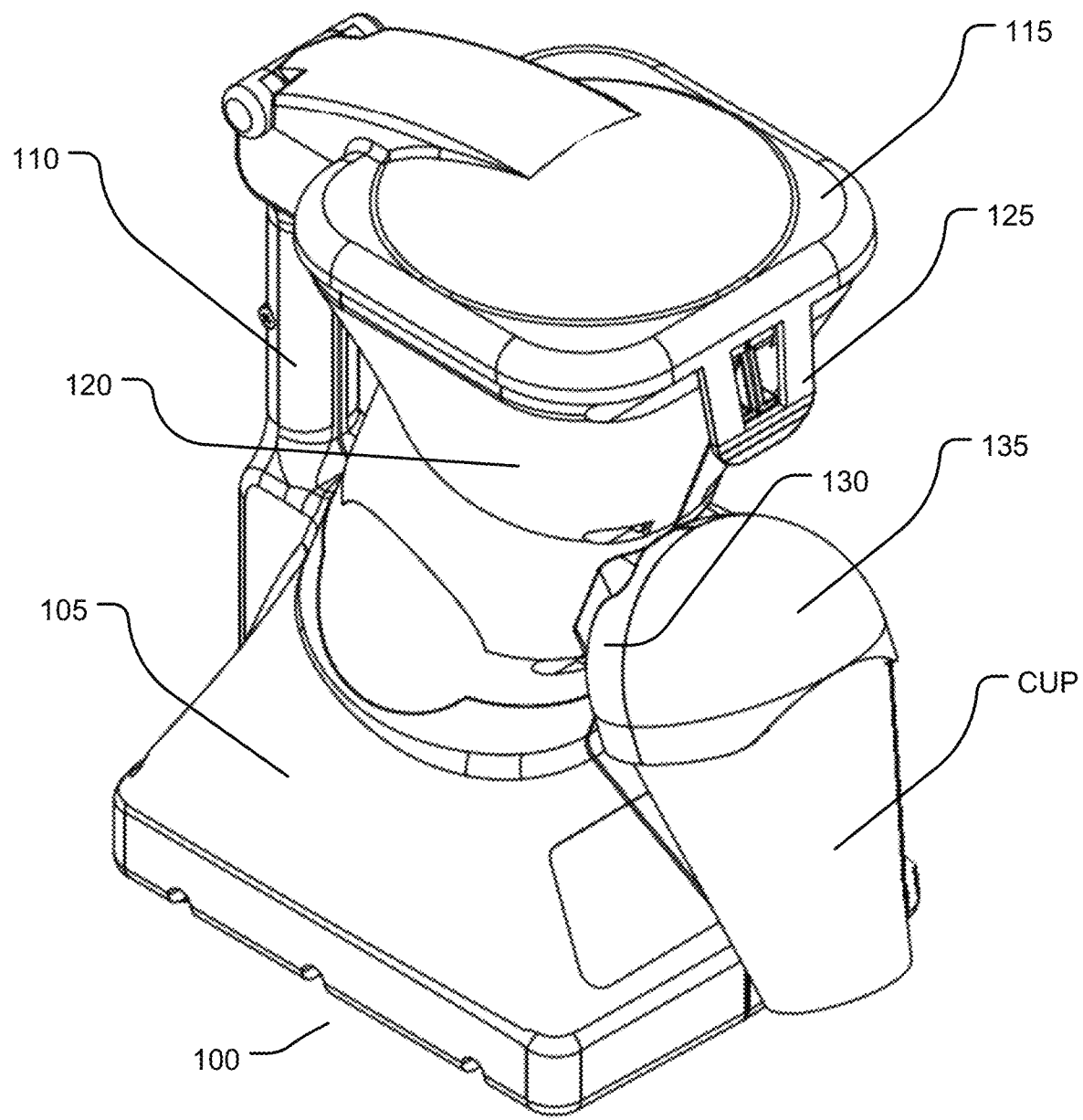
FIG. 1 illustrates an embodiment of a portable frozen confection machine in accordance with the technologies and features of the disclosure.

The disclosure extends to apparatuses, methods, and systems, for producing frozen confections and conditioning ice for use in frozen confections. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing frozen confections are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates an implementation of a frozen confection machine 100 that is configured to be portable. As can be seen in the figure the machine 100 for conditioning ice may comprise a body portion having a housing 105 and a handle portion 110 for convenient portability and positioning. The machine may further comprise a hopper 120 for receiving the ice to be conditioned. In an implementation the handle portion 110 may comprise a rubber material for providing grip for moving and holding the machine 100. The machine 100 may further comprise a lid 115 configured to cover the hopper 120. It will be appreciated that the lid 115 may comprise a transparent portion for monitoring ice in the hopper portion. The lid 115 may further have a catch 125 mechanism, such that when the catch is released 125, the lid 115 is allowed to rotate into an open position, such that ice may be introduced into the hopper 120 of the machine 100. In an embodiment, the lid 115 may be made of a clear material to provide the user the ability to see the ice level in the hopper. Additionally, the machine may comprise a spout 130 and ice shaper 135 for delivering and shaping the conditioned ice into a cup or other container for receiving the shaved ice product. It should be noted that the body 105, lid 115, spout 130 and shaper 135 may be made from any suitable material such as for example: plastics and metals.

Figure 2:
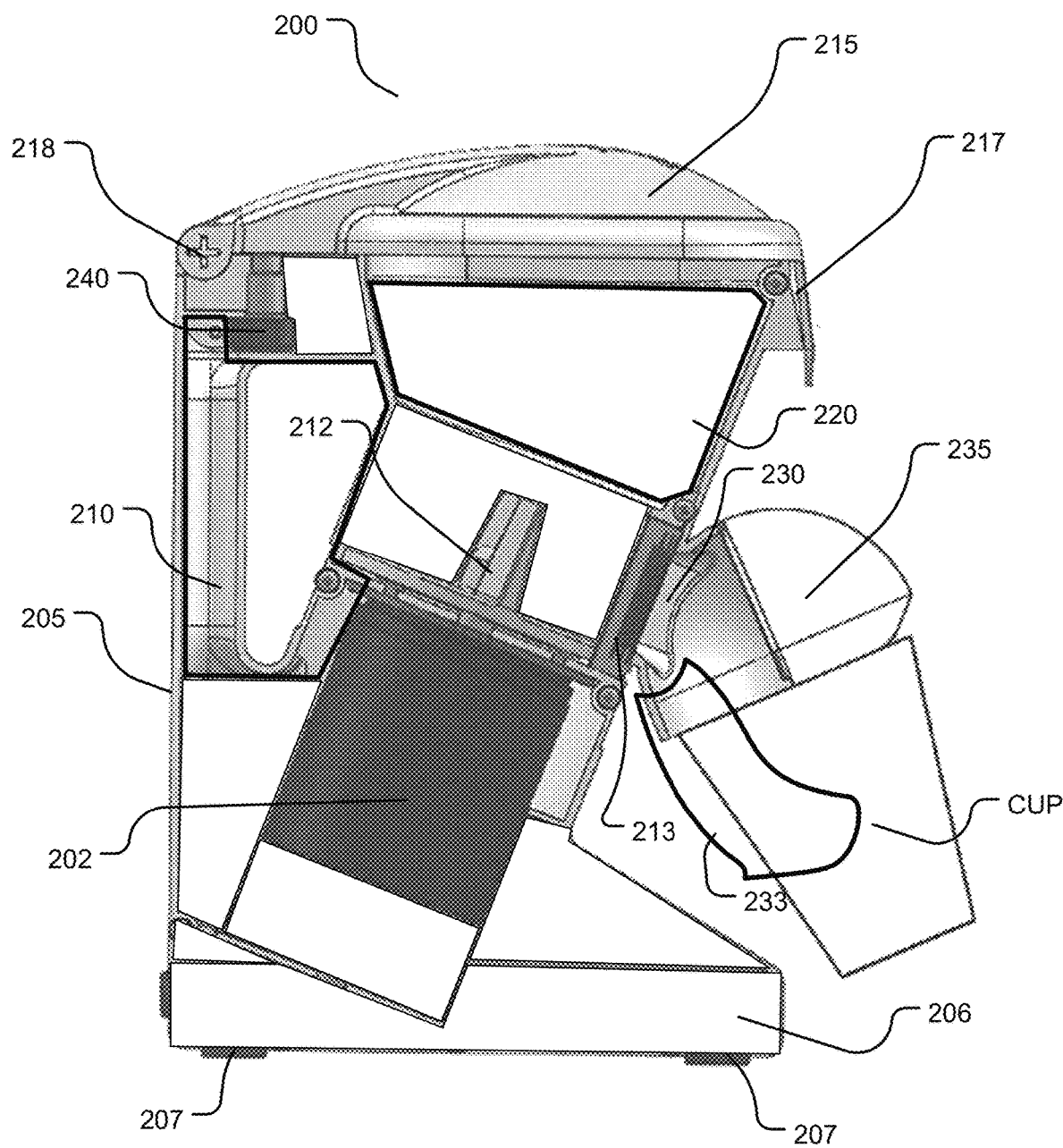
FIG. 2 illustrates a cutaway view of an embodiment of a portable frozen confection machine in accordance with the technologies and features of the disclosure.

FIG. 2 illustrates a cutaway view of a frozen confection machine 200. As can be seen in the figure, a motor 202 may be disposed within the housing 205 of the machine 200. The motor 202 may be electric and may be driven by DC or AC current. An embodiment having a DC motor may be driven by a battery that may also be disposed within the housing. The housing 205 may comprise a base portion 206 that is sized and shaped to provide stability during use. The base portion 206 may comprise feet 207 that provide traction and may be made from a vibration dampening material to reduce noise and vibration during use.

As also illustrated in the figure, the machine 200 may comprise a handle portion 210 that is configured to fit a user's hand for easy portability. The handle portion 210 may be aligned and configured so as to be held by a user during ice conditioning to compensate for forces generated by the motor 202 and the paddle 212 while conditioning the ice.

In an embodiment, the motor 202 may be directly connected to a drive shaft that drives the paddle 212 thereby moving ice into a blade 213. It should be noted that in an embodiment the motor 202 may drive a blade that spins in order to condition the ice. The motor 202 may be disposed within the housing 205, such that the motor's axis of rotation is generally aligned with the body of the machine 200. Additionally, the axis of rotation of the paddle 212 may also be generally aligned with the body of the machine 200. In an embodiment the housing 205 may further comprise a door for easily accessing the blade for maintenance.

An embodiment may comprise a motor that is indirectly connected to paddle wheel through a device with a transmission or gearing.

As can be seen in the figure, the machine may comprise a hopper 220 for receiving the unconditioned ice, and may comprise a spout portion 230 for dispensing the conditioned ice after being processed and moved throughout a portion the body of the machine 200. The spout 230 may be configured to deliver conditioned ice into a shaper 235 for providing a shaped top for the conditioned ice within a cup or container. In an implementation, and additional flexible hand shaping flap 233 may be included, which allows users more options for shaping during use without having to come into contact with the edible conditioned ice product. The flexible shaping flap may be attached near the spout as illustrated.

A lid 215 may be provided for covering the hopper 220. The lid 215 may comprise a latch 217 for locking the lid 215 in a predetermined position. Additionally, the lid 215 may be configured so as to operate a switch 240 that turns on the motor so that the machine may not be operated without the lid 215 in place, or locked in place by the latch 217. The lid may be hinged 218 relative to the body of the machine 200 so that it rotates between open and closed positions.

For example, during use the machine 200 may be positioned on a work surface by a user by way of the handle 210. The user may then lift the lid 215 to expose the hopper 220, and ice may then be introduced into the hopper 220. The lid 215 may then be closed and held down by the latch 217 or other mechanism thereby actuating the switch 240 to turn on the motor 202. The motor 202 then turns the paddle 212 to drive ice into the blade 213. The ice is conditioned as it moves through the blade 213 and into the spout 230 and shaper 235. The conditioned ice may then be delivered to a cup, or other container as may be desired by a user, and shaped by the shaper 235, and the flexible hand shaper 233, resulting in cup or container full of conditioned ice or product, which may have a pleasingly shaped top.

In an implementation, an external switch may be provided for actuating the machine. For example the external switch may be a foot pedal or other switch for actuating the machine.

Figure 3:
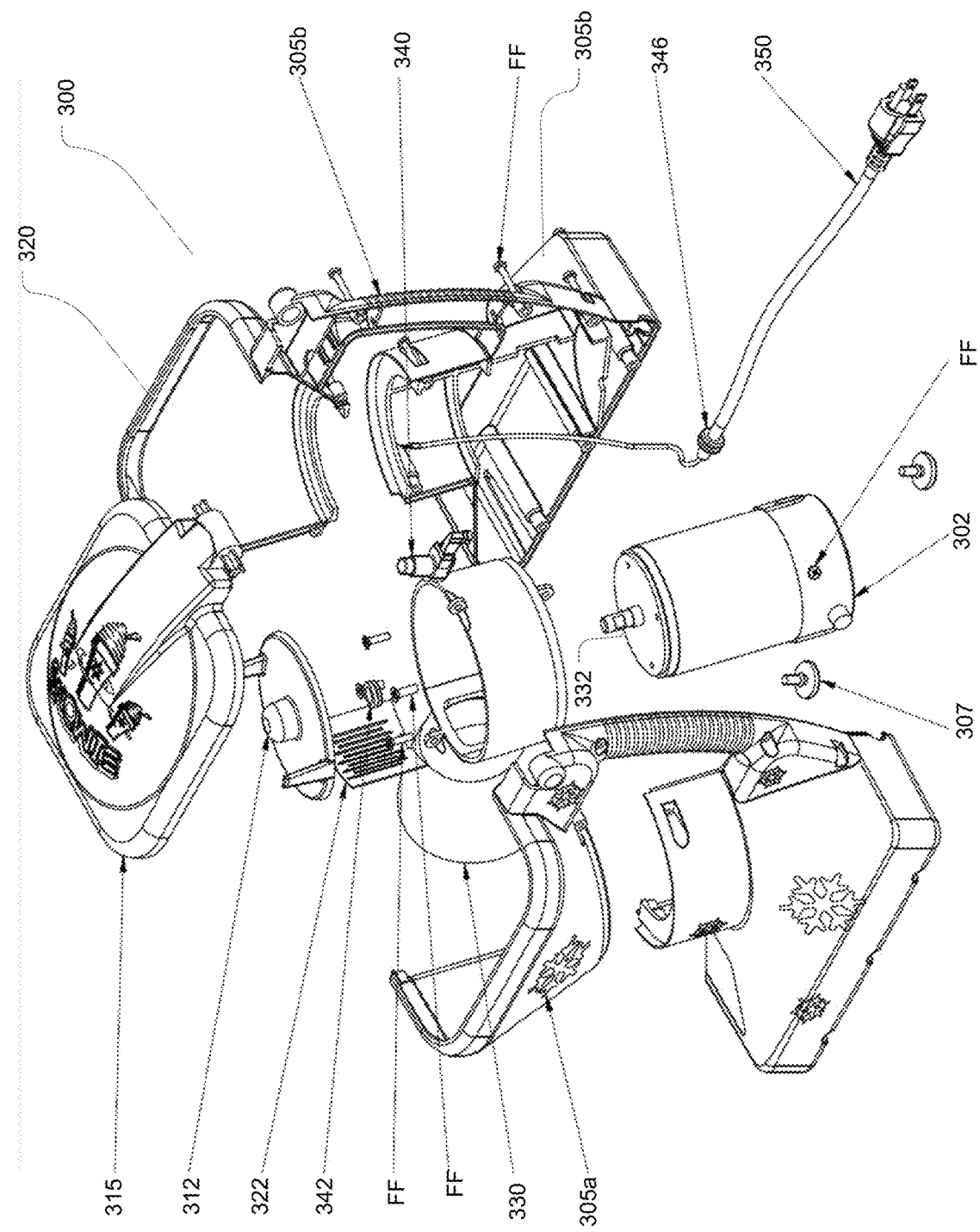
FIG. 3 illustrates an exploded view of an embodiment of a portable frozen confection machine in accordance with the technologies and features of the disclosure.

FIG. 3 illustrates an exploded view of a frozen confection machine 300. The machine may be constructed primarily of two housing halves 305a and 305b that may be joined together to thereby hold a motor 302, paddle wheel 312, and blade 322 in a working configuration relative to each other. As can be seen in the figure, a motor 302 may be disposed within the housing 305 of the machine 300. The housing halves 305a and 305b may comprise a base portion that is sized and shaped to provide stability during use. The base portion may comprise feet 307 that provide traction and may be made from a vibration dampening material to reduce noise and vibration during use.

As also illustrated in the figure, the machine 300 may comprise a handle portion that is configured to fit a user's hand for easy portability. The handle portion may be aligned and configured so as to be held by a user during ice conditioning to compensate for forces generated by the motor 302 and the paddle 312 while conditioning the ice.

In an embodiment the motor 302 may be directly connected to a drive shaft 332 that drives the paddle 312 thereby moving ice into a blade 322. It should be noted that in an embodiment the drive shaft 332 may be connected to the paddle 312 with a shaft connector 342. The motor 302 may be disposed within the housing 305a-b such that the motor's axis of rotation is generally aligned with the body of the machine 300. Additionally, the axis of rotation of the paddle 312 may also be generally aligned with the body of the machine 300. In an embodiment, the housing may further comprise a door for easily accessing the blade for maintenance.

As can be seen in the figure, the machine may comprise a hopper 320 for receiving the unconditioned ice, and may comprise a spout portion 330 for dispensing the conditioned ice after being processed and moved throughout a portion the body of the machine 300. The spout 330 may be configured to deliver conditioned ice into a shaper 335 for providing a shaped top for the conditioned ice within a cup or container.

A lid 315 may be provided for covering the hopper 320. The lid 315 may comprise a latch for locking the lid in a predetermined position. Additionally, the lid 315 may be configured so as to operate a switch 340 that turns on the motor so that the machine 300 may not be operated without the lid 315 in place. Additionally, a power cord 350 may be provided to power the machine 300. Various fasteners FF may be used to mount the various components of the machine together. Foot pads 344 may be used to dampen vibrations created during use. Rubber grommets 346 may be used to seal opening in the housing of the machine.

As can be seen in the figure, an embodiment may comprise drive shaft 332 that is directly connected to and directly drives the paddle 312.

Figure 4:
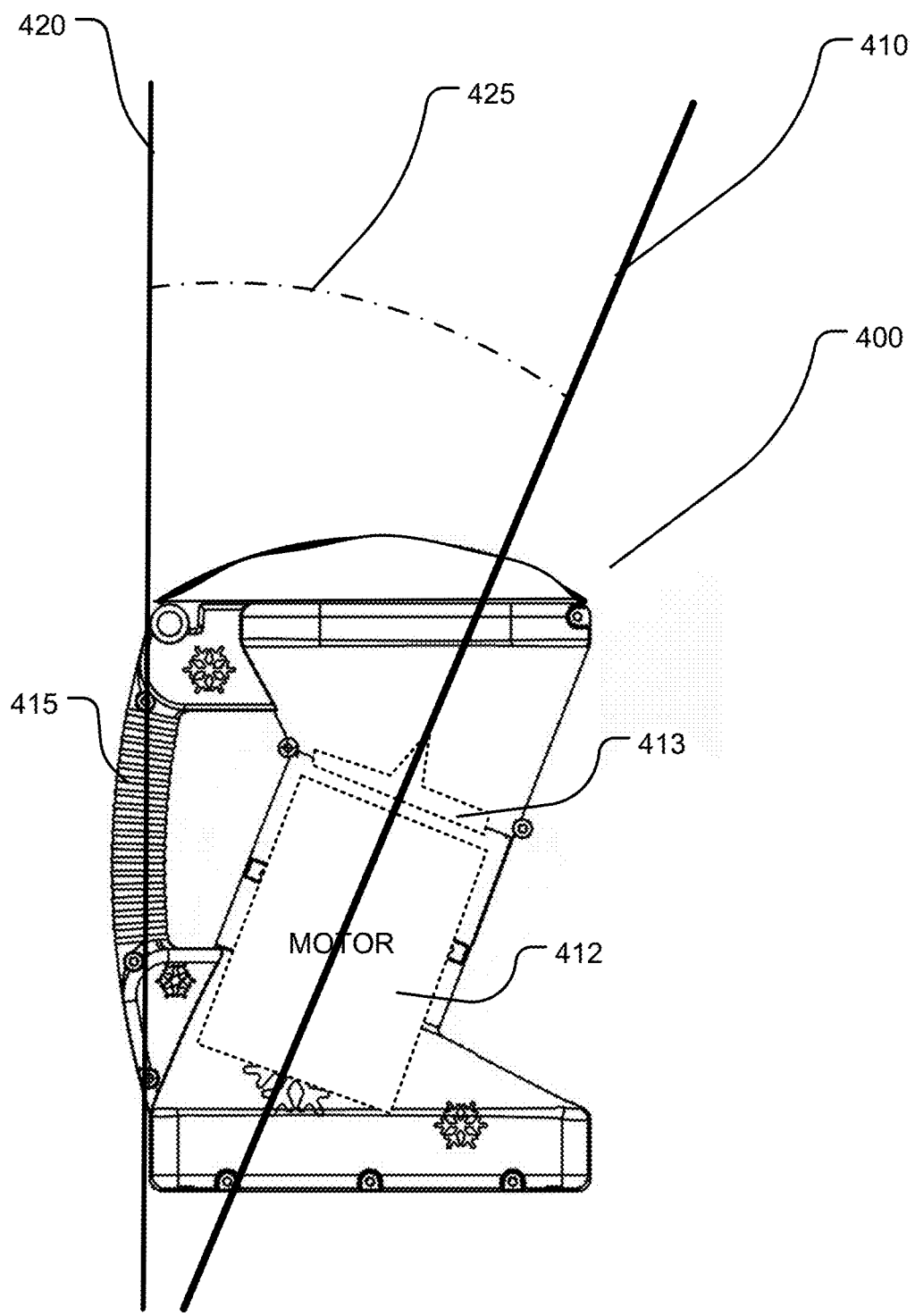
FIG. 4 illustrates an embodiment of a portable frozen confection machine illustrating its configuration angles in accordance with the technologies and features of the disclosure.

FIG. 4 illustrates an embodiment that emphasizes the angle between a handle portion and the axis of rotation of the motor 412 and paddle 413. Illustrated in the figure is a frozen confection machine 400 having an angle 425 between a first line 420 drawn through the handle portion 415 and generally aligned with the base portion of the machine and a second line 410 that represents the axis of rotation of the motor 412. The angle 425 formed by the intersection of the first line 420 and the second line 410 may be chosen during design to dampen or otherwise negate forces generated by the motor 412 and the paddle 413 as the machine processes ice. In an embodiment, the motor may be disposed within the housing, such that the drive shaft of the motor rotates about an axis 410 that is fixed at an angle relative to the handle 415. It will be appreciated that in an embodiment, the angle 425 may be selected from a range of between about 30 degrees to about 60 degrees. In an embodiment, the angle may be selected from a range of about 40 degrees to about 50 degrees. In use, a user may grasp the handle 415 to steady the machine during use.

Figure 5:
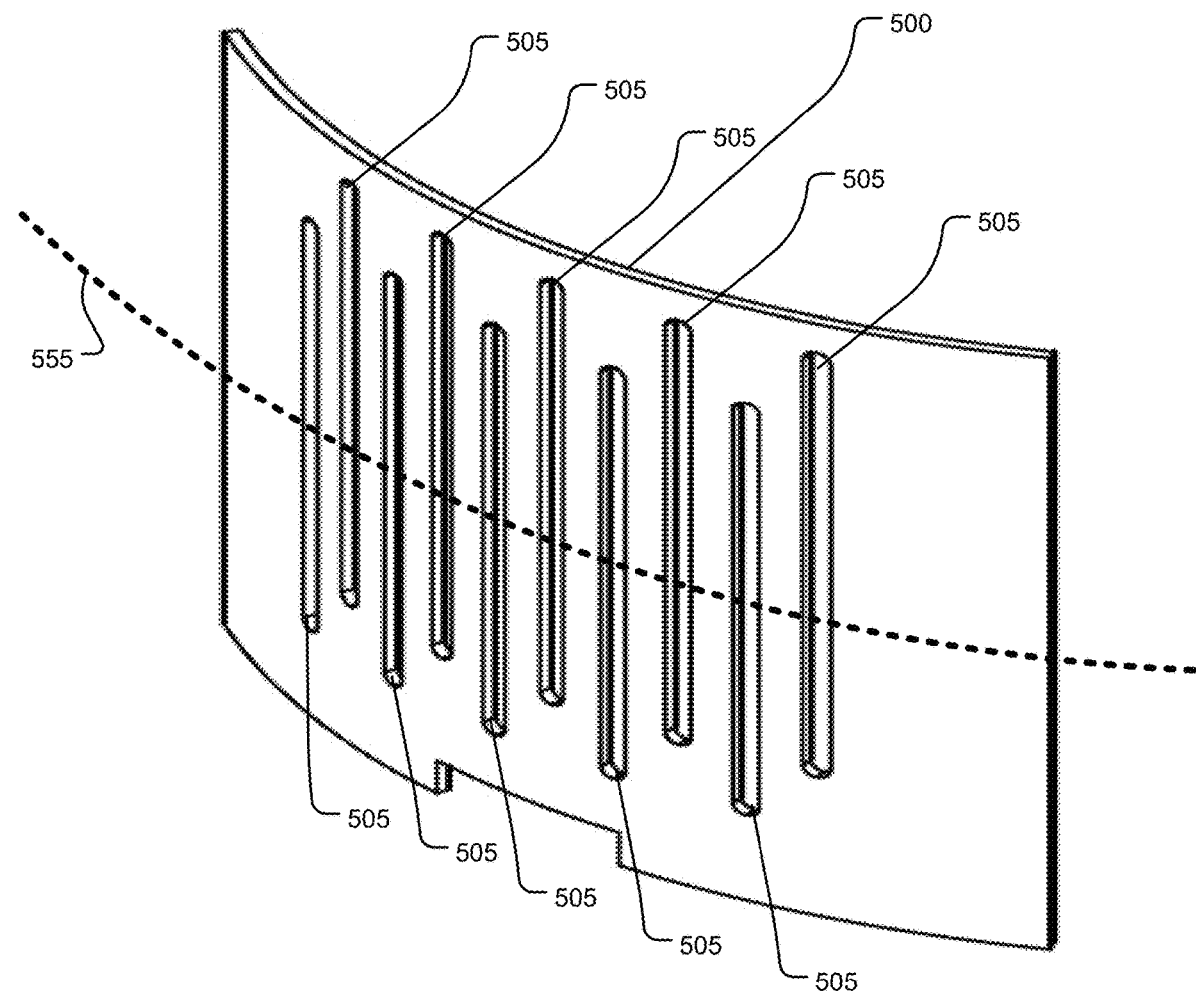
FIG. 5 illustrates an embodiment of a blade for a portable frozen confection machine in accordance with the technologies and features of the disclosure.

FIG. 5 illustrates an embodiment of a blade 500 configured for conditioning ice as it is dispensed to a user. Those in the art will know that when processing ice, ice buildup on equipment is a problem with current prior art systems. Illustrated in the figure is an embodiment of a blade 500 that resists ice buildup while providing conditioned ice suitable for confectionary use. As illustrated, a blade 500 may be arched or arcuate and may comprise a plurality of teeth 505. The teeth 505 may be configured as slots in the blade 500 that allow conditioned ice to form on a first side of the blade and pass through the blade 500 to a second side. In an embodiment, the teeth 505 may be uniform and placed regularly about the blade 500. It will be appreciated that in an embodiment the blade 500 may comprise a plurality of offset teeth 505 relative to each other. The plurality of teeth 505 may be offset in an alternating pattern. Additionally, the teeth 505 may be situated on the blade in a pattern as is illustrated in the figure. As can be seen in the figure, the teeth 505 alternate between an up position and down position relative to a center line 555, which is shown as a dashed line in the figure. This may be done to reduce icing on the teeth 505 of the blade 500. It will be appreciated that any pattern may be employed, for example, three teeth in a row may be placed in a down position relative to the centerline 555, while next three teeth are placed in an up position relative to the centerline 555. The pattern may repeat as many times as desired. It will be appreciated that any number of teeth may be placed in an up position and any number of teeth may be placed in a down position with respect to the centerline 555 without departing from the scope of the disclosure.

Figure 6:
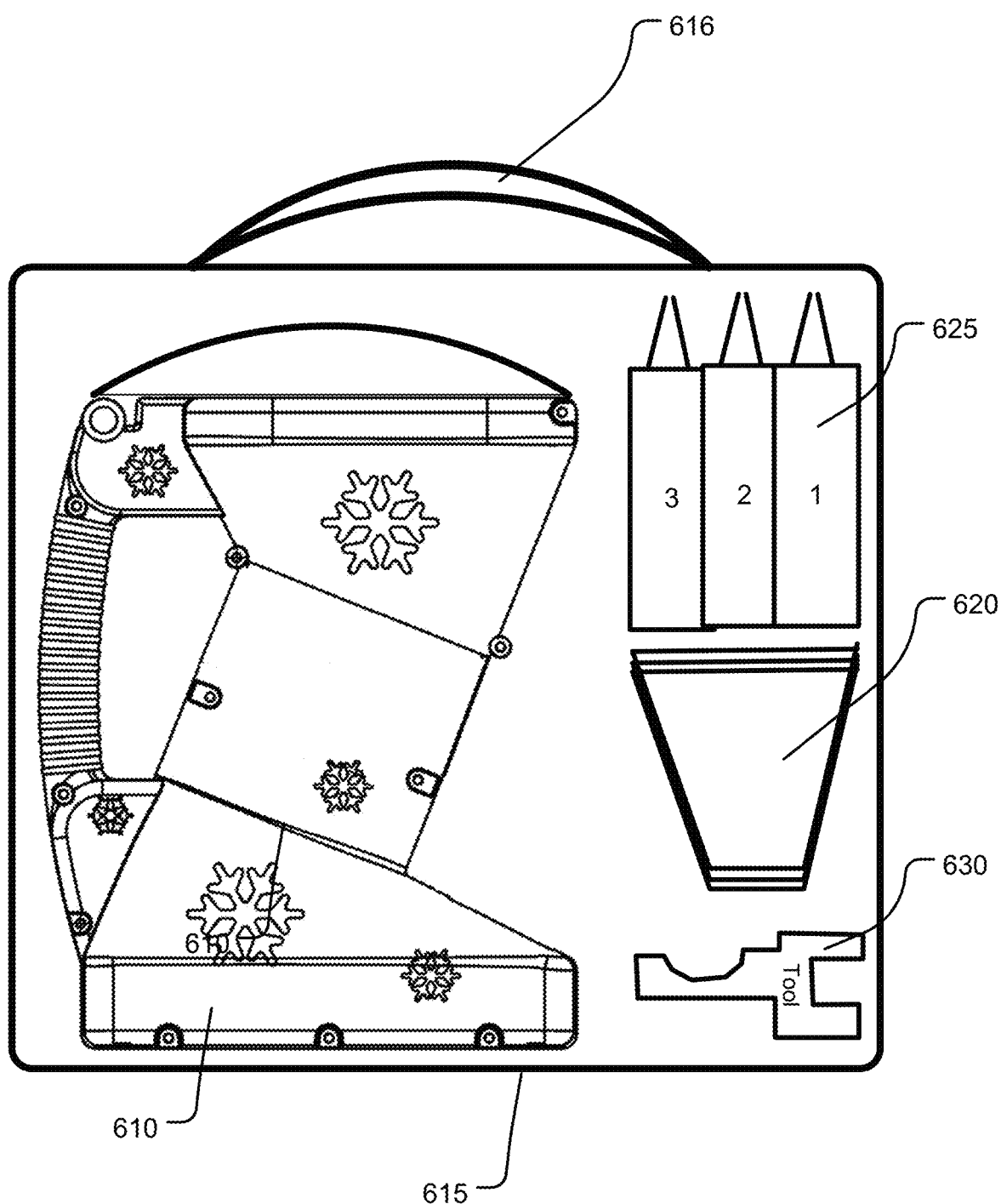
FIG. 6 illustrates an embodiment of a kit that includes a portable frozen confection machine in accordance with the technologies and features of the disclosure.

FIG. 6 illustrates an embodiment of a kit 600 comprising a frozen confection making system that comprises an ice conditioning machine 610 and a carrying case 615. The case 615 may comprise a carrying handle 616. Additionally, a kit 600 may comprise cups 620 and/or topping containers 625, which may be used to dispense flavors for the conditioned ice, for serving the conditioned ice and creating the frozen confections. Additionally, a kit 600 may comprise additional items such as a power cord, battery and backup battery. An embodiment of a kit may include a tool 630 that is specially configured for maintaining the ice conditioning machine 610.

It will be appreciated that the foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A frozen confection machine comprising:
    a housing comprising a handle on the frozen confection machine,
    a hopper portion that is configured for receiving ice therein,
    a motor comprising a drive shaft disposed within the housing,
    a blade configured to condition the ice, and
    a spout configured for dispensing conditioned ice, wherein the spout includes an ice shaper disposed to surround the spout,
    wherein the blade is disposed within the housing and further disposed between the hopper portion and the spout, and
    wherein an opening of the ice shaper where conditioned ice is dispensed is angled to be pointed in a direction that is downward and away from the frozen confection machine.

2. The frozen confection machine of claim 1, wherein the blade is stationary relative to the housing.

3. The frozen confection machine of claim 2, wherein the blade is arched.

4. The frozen confection machine of claim 1, wherein the blade comprises a plurality of offset teeth relative to each other.

5. The frozen confection machine of claim 4, wherein the plurality of teeth are offset in an alternating pattern.

6. The frozen confection machine of claim 1, further comprising a lid configured for covering the hopper portion.

7. The frozen confection machine of claim 6, wherein the lid has a transparent portion for monitoring ice in the hopper portion.

8. The frozen confection machine of claim 7, further comprising a flexible shaping flap that is attached near the spout.

9. The frozen confection machine of claim 6, wherein the lid comprises a latch for holding the lid in a closed position.

10. The frozen confection machine of claim 6, further comprising a switch which prevents operation of the motor unless the lid is installed on the hopper portion.

11. The frozen confection machine of claim 1, further comprising a paddle wheel for moving ice into the blade.

12. The frozen confection machine of claim 11, wherein the paddle wheel is directly connected to the drive shaft of the motor.

13. The frozen confection machine of claim 1, wherein the handle is vertically oriented with respect to a vertical axis defined by the frozen confection machine; and wherein the motor is disposed within the housing, such that the drive shaft of the motor rotates about an axis that is fixed at an angle relative to the vertically oriented handle.

14. The frozen confection machine of claim 13, wherein the angle is selected from a range of 40 degrees to 50 degrees.

15. The frozen confection machine of claim 13, wherein the angle is selected from a range between 30 degrees to 60 degrees.

16. The frozen confection machine of claim 1, wherein the motor is an AC current motor.

17. The frozen confection machine of claim 1, wherein the motor is a DC current motor.

18. The frozen confection machine of claim 1, further comprising a switch.

19. The frozen confection machine of claim 1, further comprising damping feet.

20. A kit for making frozen confections comprising:
   a frozen confection machine configured to be portable,
   a plurality of confectionary topping containers configured to be used with a conditioned ice product of the frozen confection machine,
   wherein the frozen confection machine comprises:
      a housing comprising a handle on the frozen confection machine,
      a hopper portion that is configured for receiving ice therein,
      a motor comprising a drive shaft disposed within the housing,
      a blade configured to condition the ice, and
      a spout configured for dispensing conditioned ice, ice shaper disposed to surround the spout,
   wherein the blade is disposed within the housing and further disposed between the hopper portion and the spout, and
   wherein an opening of the ice shaper where conditioned ice is dispensed is angled to be pointed in a direction that is downward and away from the frozen confection machine.

21. The kit of claim 20, wherein the kit further comprises a carrying case configured to carry said frozen confection machine and said confectionary topping containers.

22. The kit of claim 20, wherein the kit further comprises serving containers configured to hold and serve conditioned ice product of the frozen confection machine.

23. The kit of claim 20, wherein the kit further comprises a hand tool configured for maintaining the frozen confection machine.

* * * * *